(12) United States Patent
Jo et al.

(10) Patent No.: US 12,724,532 B2
(45) Date of Patent: Sep. 1, 2026

(54) MEMORY DEVICE INCLUDING CONTENT ADDRESSABLE MEMORY AND METHOD OF INPUTTING AND OUTPUTTING DATA THEREOF

(71) Applicant: SAMSUNG ELECTRONICS CO., LTD., Suwon-si (KR)

(72) Inventors: Byoungkon Jo, Suwon-si (KR); Minwoo Lee, Suwon-si (KR); Joonho Jun, Suwon-si (KR); Duk Sung Kim, Suwon-si (KR); Doohee Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 39 days.

(21) Appl. No.: 18/597,373

(22) Filed: Mar. 6, 2024

(65) Prior Publication Data

US 2025/0013366 A1 Jan. 9, 2025

(30) Foreign Application Priority Data

Jul. 6, 2023 (KR) ........................ 10-2023-0088002

(51) Int. Cl.
*G06F 3/06* (2006.01)

(52) U.S. Cl.
CPC .......... *G06F 3/0608* (2013.01); *G06F 3/0659* (2013.01); *G06F 3/0673* (2013.01)

(58) Field of Classification Search
None
See application file for complete search history.

(56) References Cited

U.S. PATENT DOCUMENTS 6,456,517 B2 9/2002 Kim et al.
6,768,992 B1 * 7/2004 Jolitz ...................... H04L 69/22 707/999.005
9,048,855 B2 6/2015 Bae et al.
9,672,239 B1 6/2017 Rottenstreich et al.
9,852,807 B1 * 12/2017 Elmufdi ................ G11C 29/54
10,418,103 B1 9/2019 Buchanan et al.
(Continued)

FOREIGN PATENT DOCUMENTS

CN 101079764 A 11/2007
CN 101887748 A 11/2010
(Continued)

*Primary Examiner* — Baboucarr Faal
(74) *Attorney, Agent, or Firm* — Sughrue Mion, PLLC

(57) ABSTRACT

There is provided a memory device including a content addressable memory physical layer connected to external data pads. During the write operation, the content addressable memory physical layer transmits a selected data pattern from among data patterns stored in a content addressable memory cell array as input data to selected memory cells of a memory cell array corresponding to an address received from external device based on first data received from the external data pads. During the read operation, the content addressable memory physical layer compares output data read from the memory cell array with the data patterns based on an address received from external device, and outputs content addressable memory address corresponding to data pattern matched by a result of the comparing as second data through the external data pads.

20 Claims, 11 Drawing Sheets

(56) References Cited

U.S. PATENT DOCUMENTS

| | | | | |
|---|---|---|---|---|
| 2011/0283061 | A1* | 11/2011 | Reddy | G11C 15/00 711/108 |
| 2020/0335146 | A1* | 10/2020 | Alrod | G11C 16/26 |
| 2024/0312548 | A1* | 9/2024 | Chiang | G11C 29/20 |

FOREIGN PATENT DOCUMENTS

| | | | |
|---|---|---|---|
| CN | 113421879 | B | 9/2021 |
| KR | 10-038774 | B1 | 5/2003 |
| KR | 10-0782327 | B1 | 12/2007 |

* cited by examiner

1200
Memory Cell Array
1210
BL
BLSA
1240
ODAT
IDAT
1242
IOSA
1241
IODRV
WL
ROW DEC
1221
COL DEC
1222
CAM Controller
1260
CAM PHY
1250
CAM Cell Array
1251
RA
CA
ADDR DEC
1220
CMD DEC
1230
ADDR
CMD
DATA

FIG. 4

| | CAM Address | | | | Data Pattern | | | | | | | | | | | | | | | | |
|---|---|---|---|---|---|---|---|---|---|---|---|---|---|---|---|---|---|---|---|---|---|
| | DQ3 | DQ2 | DQ1 | DQ0 | P15 | P14 | P13 | P12 | P11 | P10 | P9 | P8 | P7 | P6 | P5 | P4 | P3 | P2 | P1 | P0 | |
| CADDR1 | 0 | 0 | 0 | 0 | 0 | 0 | 0 | 0 | 0 | 0 | 0 | 0 | 0 | 0 | 0 | 0 | 0 | 0 | 0 | 0 | DPT1 |
| CADDR2 | 0 | 0 | 0 | 1 | 0 | 0 | 0 | 1 | 0 | 0 | 0 | 1 | 0 | 0 | 0 | 1 | 0 | 0 | 0 | 1 | DPT2 |
| CADDR3 | 0 | 0 | 1 | 0 | 0 | 0 | 1 | 0 | 0 | 0 | 1 | 0 | 0 | 0 | 1 | 0 | 0 | 0 | 1 | 0 | DPT3 |
| CADDR4 | 0 | 0 | 1 | 1 | 0 | 0 | 1 | 1 | 0 | 0 | 1 | 1 | 0 | 0 | 1 | 1 | 0 | 0 | 1 | 1 | DPT4 |
| CADDR5 | 0 | 1 | 0 | 0 | 0 | 1 | 0 | 0 | 0 | 1 | 0 | 0 | 0 | 1 | 0 | 0 | 0 | 1 | 0 | 0 | DPT5 |
| CADDR6 | 0 | 1 | 0 | 1 | 0 | 1 | 0 | 1 | 0 | 1 | 0 | 1 | 0 | 1 | 0 | 1 | 0 | 1 | 0 | 1 | DPT6 |
| CADDR7 | 0 | 1 | 1 | 0 | 0 | 1 | 1 | 0 | 0 | 1 | 1 | 0 | 0 | 1 | 1 | 0 | 0 | 1 | 1 | 0 | DPT7 |
| CADDR8 | 0 | 1 | 1 | 1 | 0 | 1 | 1 | 1 | 0 | 1 | 1 | 1 | 0 | 1 | 1 | 1 | 0 | 1 | 1 | 1 | DPT8 |
| CADDR9 | 1 | 0 | 0 | 0 | 1 | 0 | 0 | 0 | 1 | 0 | 0 | 0 | 1 | 0 | 0 | 0 | 1 | 0 | 0 | 0 | DPT9 |
| CADDR10 | 1 | 0 | 0 | 1 | 1 | 0 | 0 | 1 | 1 | 0 | 0 | 1 | 1 | 0 | 0 | 1 | 1 | 0 | 0 | 1 | DPT10 |
| CADDR11 | 1 | 0 | 1 | 0 | 1 | 0 | 1 | 0 | 1 | 0 | 1 | 0 | 1 | 0 | 1 | 0 | 1 | 0 | 1 | 0 | DPT11 |
| CADDR12 | 1 | 0 | 1 | 1 | 1 | 0 | 1 | 1 | 1 | 0 | 1 | 1 | 1 | 0 | 1 | 1 | 1 | 0 | 1 | 1 | DPT12 |
| CADDR13 | 1 | 1 | 0 | 0 | 1 | 1 | 0 | 0 | 1 | 1 | 0 | 0 | 1 | 1 | 0 | 0 | 1 | 1 | 0 | 0 | DPT13 |
| CADDR14 | 1 | 1 | 0 | 1 | 1 | 1 | 0 | 1 | 1 | 1 | 0 | 1 | 1 | 1 | 0 | 1 | 1 | 1 | 0 | 1 | DPT14 |
| CADDR15 | 1 | 1 | 1 | 0 | 1 | 1 | 1 | 0 | 1 | 1 | 1 | 0 | 1 | 1 | 1 | 0 | 1 | 1 | 1 | 0 | DPT15 |
| CADDR16 | 1 | 1 | 1 | 1 | 1 | 1 | 1 | 1 | 1 | 1 | 1 | 1 | 1 | 1 | 1 | 1 | 1 | 1 | 1 | 1 | DPT16 |

Figure 6:
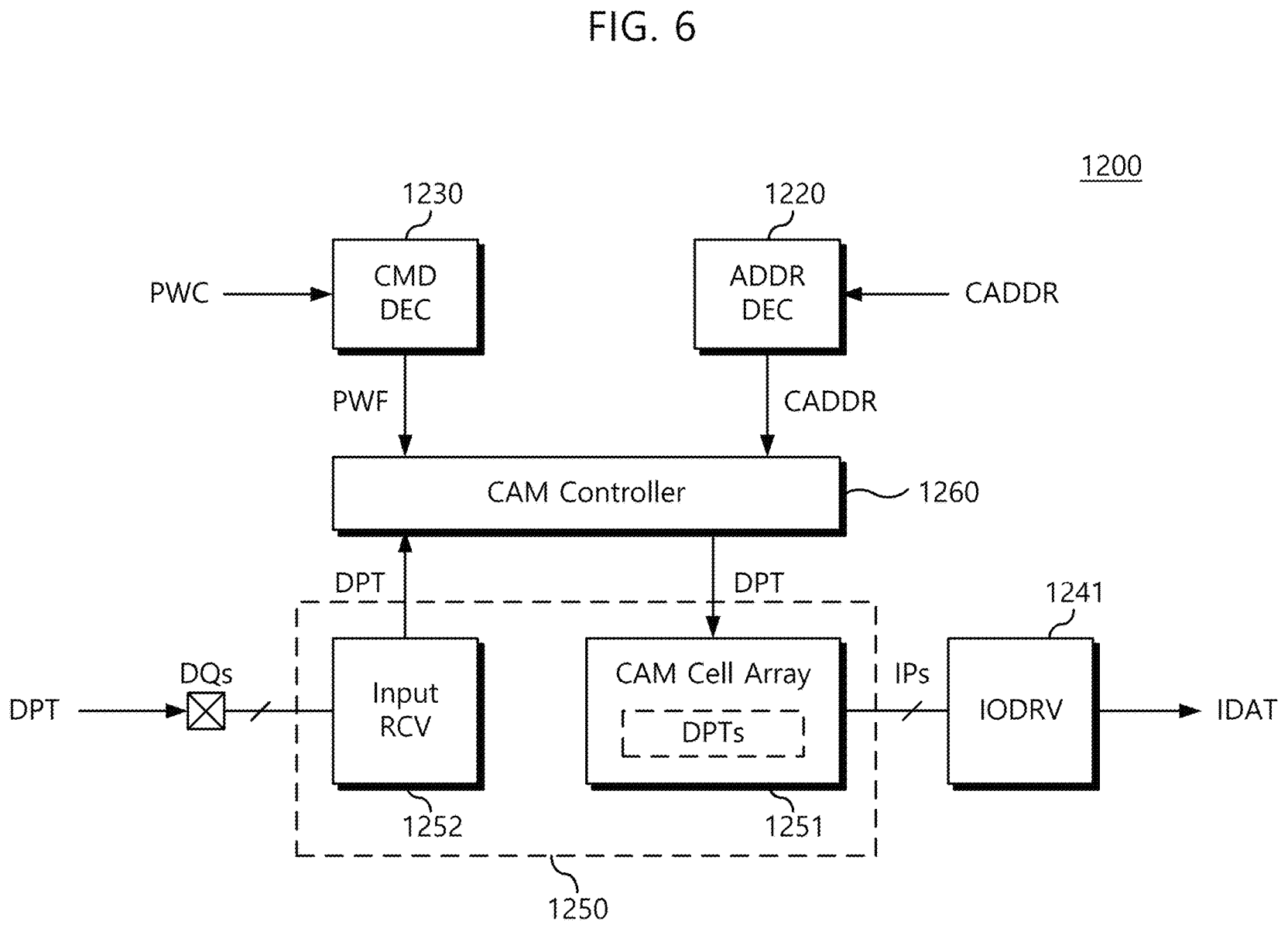

CADDR
ADDR DEC
1220
CADDR
CMD DEC
1230
PWC
PWF
CAM Controller
1260
DPT
DPT
IODRV
1241
IDAT
IPs
CAM Cell Array
DPTs
1251
Input RCV
1252
1250
DQs
DPT

Figure 8:
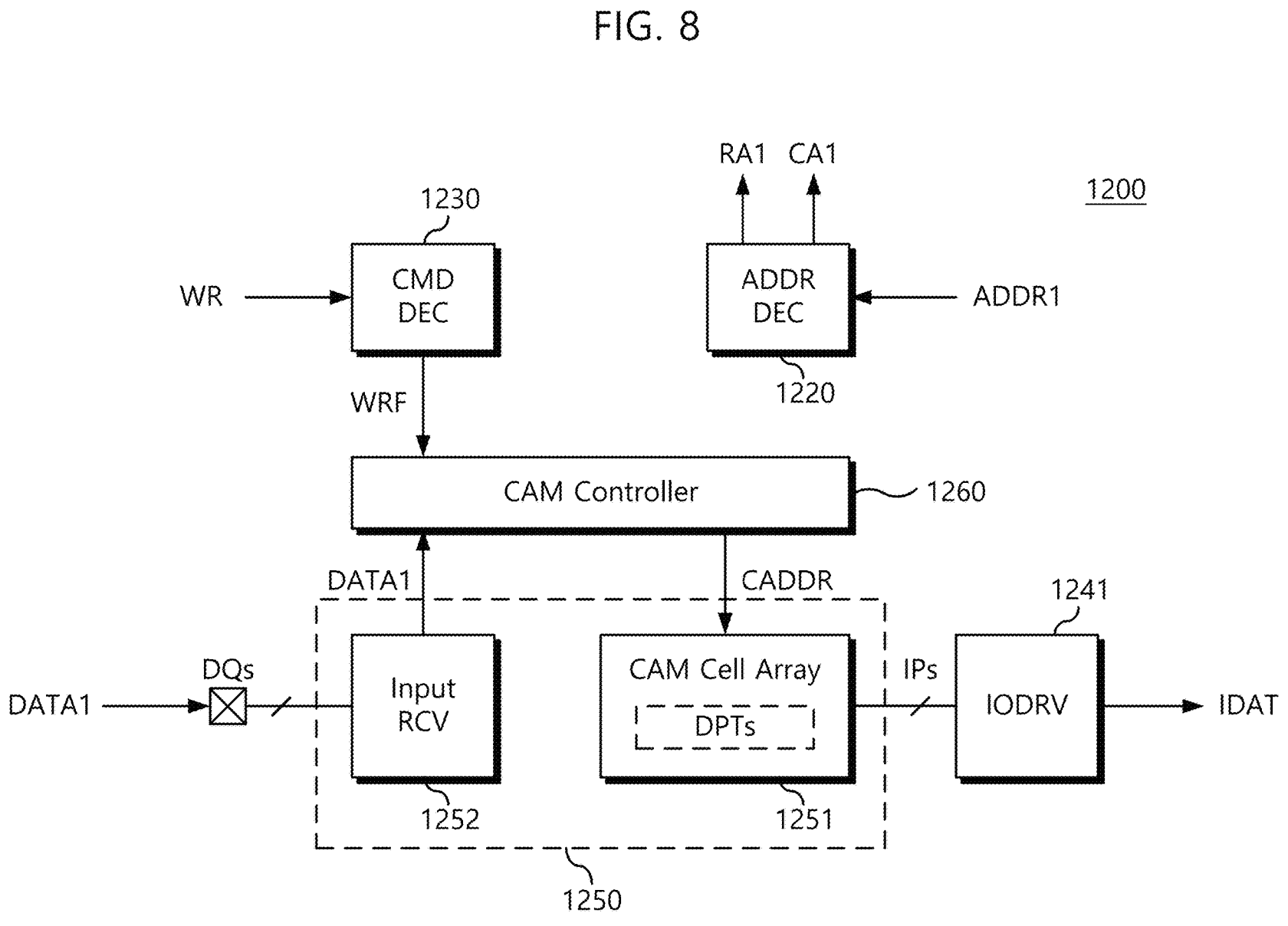

ADDR1
RA1
CA1
ADDR DEC
1220
1260
CAM Controller
1230
CMD DEC
WR
WRF
CADDR
DATA1
IDAT
1241
IODRV
IPs
CAM Cell Array
DPTs
1251
1250
Input RCV
1252
DQs
DATA1

1200
RA2
CA2
1230
CMD DEC
RD
ADDR DEC
ADDR2
1220
RDF
CAM Controller
1260
CAM Cell Array
DPTs
1251
1242
DATA2
DQs
Output DRV
CADDR
Data Pattern Comparator
OPs
IOSA
ODAT
1254
1253
1250

2000
2200
Memory Chip 2200
Memory Cell Array
2210
2202
2250
CAM PHY 2
2201
BP1
CAM Controller
2260
2101
2115
2102
CAM PHY 1
Memory Controller
2110
Logic Core
2120
Logic Chip 2100
BP2

MEMORY DEVICE INCLUDING CONTENT ADDRESSABLE MEMORY AND METHOD OF INPUTTING AND OUTPUTTING DATA THEREOF

CROSS-REFERENCE TO RELATED APPLICATIONS

This application is based on and claims priority under 35 U.S.C. § 119 to Korean Patent Application No. 10-2023-0088002 filed on Jul. 6, 2023, in the Korean Intellectual Property Office, the disclosure of which is incorporated by reference herein in its entirety.

BACKGROUND

1. Field

The disclosure relates generally to a semiconductor memory device, and more particularly, to a memory device including a content addressable memory (CAM) and a method of inputting and outputting data in the memory device.

2. Description of Related Art

Semiconductor memory devices are generally classified as volatile memory devices and nonvolatile memory devices. Volatile memory devices have high reading and writing speeds, but lose their stored data when their power supplies are interrupted. In contrast, nonvolatile memory devices can retain their stored data even when their power supplies are interrupted.

Examples of volatile memory devices may include a dynamic random access memory (DRAM) device and a static random access memory (SRAM) device. A memory cell of a volatile memory device may include a single N-type transistor, serving as a switch, and a single capacitor storing electric charges as DATA. Binary information “1” or “0” may correspond to the presence or absence of the electric charges stored in the capacitor in the memory cell, for example, whether a terminal voltage of a cell capacitor is high or low. The memory cell may be connected to a wordline and a bitline. The bitline may be connected to a sense amplifier. The sense amplifier may sense data, stored in the memory cell, through the bitline based on a voltage applied to the wordline.

As package technology advances, a volatile memory device and a memory controller are being provided in one package. Additionally, a package is being provided in which a memory chip including a volatile memory device is stacked on a logic chip including a memory controller. However, due to an increase in a bandwidth between the logic chip and the memory chip, there is an increase in occurrences of problems of heat generation by an input/output power of the memory chip.

SUMMARY

One or more aspects of the disclosure provide a memory device including a content addressable memory (CAM) which stores a plurality of data patterns. The memory device may store data pattern of the CAM corresponding to received data in a memory cell array of the memory device to use a smaller number of external data pads compared to actual internal data paths of the memory device.

One or more aspects of the disclosure provide a method of inputting and outputting data in a memory device including a CAM which stores a plurality of data patterns.

One or more aspects of the disclosure provide a memory device stacked on a memory controller by reducing the amount of heat generated by data pads.

According to an aspect of the disclosure, there is provided a memory device including: a memory cell array including memory cells; an address decoder configured to output address information based on an address received from an external device; a command decoder configured to generate a memory access signal based on a command received from the external device; a content addressable memory (CAM) cell array configured to store a plurality of data patterns; and a CAM physical layer connected to a plurality of external data pads, the CAM physical layer configured to: based on the memory access signal being a write operation signal, transmit a first data pattern from among the plurality of data patterns as input data to first memory cells of the memory cell array corresponding to the address information based on first data received through the plurality of external data pads, and based on the memory access signal being a read operation signal, compare output data from the memory cell array with the plurality of data patterns based on the address information, and output a first CAM address corresponding to a second data pattern matching the output data as second data through the plurality of external data pads.

According to another aspect of the disclosure, there is provided a method of operating a memory device, the method including: receiving a plurality of content addressable memory (CAM) addresses; receiving a plurality of data patterns through a plurality of external data pads, each of the plurality of data patterns corresponding to one of the plurality of CAM addresses; storing the plurality of data patterns in a CAM cell array based on the plurality of CAM addresses; receiving a write command and a first address; receiving first data through the plurality of external data pads; selecting a first data pattern corresponding to the first data from among the plurality of data patterns stored in the CAM cell array; and storing the first data pattern as input data in a memory cell array.

According to another aspect of the disclosure, there is provided a memory system including: a logic chip including a logic core, a memory controller and a first content addressable memory (CAM) physical layer; and a memory chip stacked on the logic chip, the memory chip including a memory cell array and a second CAM physical layer, wherein the first CAM physical layer includes a first CAM cell array configured to store a plurality of data patterns, wherein the second CAM physical layer includes a second CAM cell array configured to store the plurality of data patterns, wherein the first CAM physical layer and the second CAM physical layer are configured to exchange encoded data with a smaller capacity than an original data through a plurality of external data pads based on the plurality of data patterns, and wherein a number of the plurality of external data pads is smaller than a number of internal data paths of the logic chip or the memory chip.

Additional aspects will be set forth in part in the description which follows and, in part, will be apparent from the description, or may be learned by practice of the presented embodiments.

BRIEF DESCRIPTION OF DRAWINGS

The embodiments of the disclosure are illustrated in the accompanying drawings, throughout which like reference letters indicate corresponding parts in the various figures. The embodiments herein will be better understood from the following description with reference to the drawings, in which:

FIG. 4 is a table illustrating an example of data patterns stored in a content addressable memory cell array according to an embodiment.

FIG. 6 is a diagram illustrating data flow during a pattern write operation of FIG. 5.

FIG. 8 is a diagram illustrating data flow during a write operation of FIG. 7.

DETAILED DESCRIPTION

Figure 1:
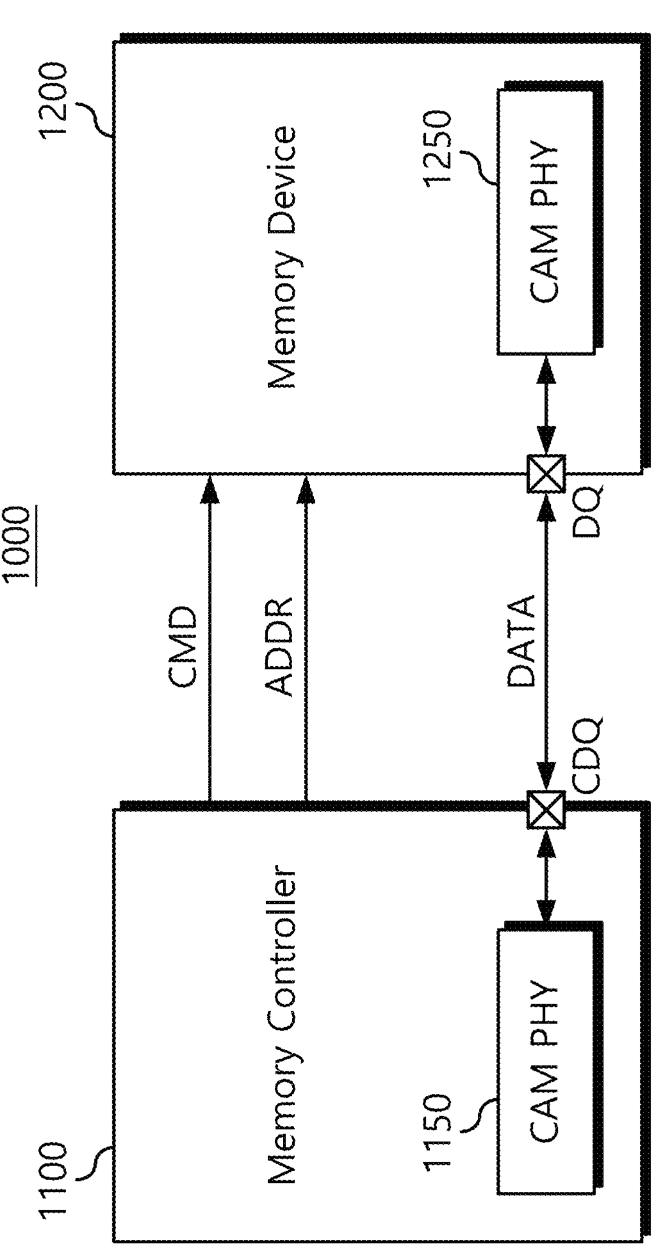
FIG. 1 is a block diagram illustrating a memory system according to an embodiment.

Hereinafter, various embodiments will be described in detail with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. As used herein, an expression "at least one of" preceding a list of elements modifies the entire list of the elements and does not modify the individual elements of the list. For example, an expression, "at least one of a, b, and c" should be understood as including only a, only b, only c, both a and b, both a and c, both b and c, or all of a, b, and c.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all example embodiments are not limited thereto.

The embodiments of the disclosure are example embodiments, and thus, the disclosure is not limited thereto and may be realized in various other forms. As is traditional in the field, embodiments may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Hereinafter, a DRAM will be used as an example for illustrating features, structures, operations, functions, etc., of the disclosure. However, the disclosure is not limited thereto, and as such, features, structures, operations, functions, etc., of the disclosure may be implemented or applied to other electronic devices or other memory devices according to other embodiment. Moreover, other features, structures, operations, functions, etc., may be easily understood from information disclosed herein by a person of ordinary skill in the art. The disclosure may be implemented by other embodiments or applied to other embodiments or apparatus. Further, the detailed description may be modified or changed according to viewpoints and applications without escaping from the scope, spirit, and other objects of the disclosure.

FIG. 1 is a block diagram illustrating a memory system according to an example embodiment. Referring to FIG. 1, a memory system 1000 according to an embodiment may include a memory controller 1100 and a memory device 1200.

According to an example embodiment, the memory controller 1100 may perform one or more operations of controlling the memory device 1200. For example, the memory controller 1100 may perform an access operation to write data in the memory device 1200 or to read data stored in the memory device 1200. For example, the memory controller 1100 may generate a command CMD and an address ADDR for writing data in the memory device 1200 or reading data stored in the memory device 1200. The memory controller 1100 may include at least one of a memory controller circuitry, a system-on-chip (SoC), a central processing unit (CPU), a digital signal processor (DSP), and a graphics processing unit (GPU). The SoC may be an application processor (AP). However, the disclosure is not limited thereto, and as such, the memory controller 1100 may be implemented by other types of processors or electronic components.

According to an example embodiment, the memory controller 1100 may provide various signals to the memory device 1200 to control an overall operation of the memory device 1200. For example, the memory controller 1100 may control memory access operations of the memory device 1200. For example, the memory access operations may include, but is not limited to, a read operation and a write operation. The memory controller 1100 may provide the command CMD and the address ADDR to the memory device 1200 to write data DATA in the memory device 1200 or to read data DATA from the memory device 1200. In an example case in which the write operation is performed, the memory controller 1100 may transmit or send the command CMD, the address ADDR and data DATA to the memory device 1200 to write the data DATA in the memory device 1200. In another example case in which the read operation is performed, the memory controller 1100 may transmit or send the command CMD and the address ADDR to the memory device 1200 to read data DATA from the memory device 1200. In this case, the memory controller 1100 may receive the data DATA from the memory device 1200.

According to an example embodiment, the memory controller 1100 may generate various types of commands CMD to control the memory device 1200. For example, the memory controller 1100 may generate a bank request corresponding to a bank operation of changing a state of a memory bank, among memory banks, to read or write data DATA. As an example, the bank request may include an active request for changing a state of a memory bank, among the memory banks, to an active state. The memory device 1200 may activate a row included in the memory bank, for example, a wordline, based on the active request. The bank request may include a precharge request for changing the memory banks from an active state to a standby state after reading or writing of data DATA is completed. In addition, the memory controller 1100 may generate an input/output (I/O) request for the memory device 1200 to perform a read operation or a write operation of data DATA. For example, the I/O request may be a column address strobe (CAS) request. In an example case in which a read operation is performed, the I/O request may include a read request for reading data DATA from activated memory banks. In an example case in which a write operation is performed, the I/O request may include a write request for writing data DATA in the activated memory banks. The memory controller 1100 may generate a refresh command to control a refresh operation on the memory banks. However, the types of commands CMD described herein are merely exemplary, and other types of commands CMD may be provided or implemented in the memory system.

According to an example embodiment, the memory device 1200 may output data DATA, requested to be read by the memory controller 1100, to the memory controller 1100 or may store data DATA, requested to be written by the memory controller 1100, in a memory cell of the memory device 1200. The memory device 1200 may input and output data DATA based on the command CMD and the address ADDR. The memory device 1200 may include memory banks. The memory device 1200 may include at least one data pad DQ. The memory device 1200 may input and output data DATA through the data pad DQ. The data pad DQ may be connected to input buffer or output buffer.

The memory device 1200 may be a volatile memory device including, but not limited to, a dynamic random access memory (DRAM), a synchronous dynamic random access memory (SDRAM), a double data rate (DDR) DRAM, a DDR SDRAM, a low-power double data rate (LPDDR) SDRAM, a graphics double data rate (GDDR) SDRAM, a Rambus dynamic random access memory (RDRAM), and a static random access memory (SRAM), or the like. According to another embodiment, the memory device 1200 may be implemented as a nonvolatile memory device including, but not limited to, a resistive RAM (RRAM), a phase change memory (PRAM), a magnetoresistive memory (MRAM), a ferroelectric memory (FRAM), a spin-transfer torque RAM (STT-RAM), or the like. In the description below, the features and advantages of the disclosure have been described with respect to a DRAM, but example embodiments are not limited thereto.

According to an example embodiment, the memory banks may include a memory cell array divided in units of banks. Moreover, the memory may include, but is not limited to, a row decoder, a column decoder, a sense amplifier, a write driver, or the like. The memory banks may store data DATA, requested to be written in the memory device 1200, using the write driver and may read data DATA, requested to be read, using the sense amplifier. The memory banks may further include a component to perform a refresh operation of storing and maintaining data in the cell array, or select circuits based on an address.

According to an example embodiment, the memory device 1200 may include a content addressable memory physical layer (CAM PHY) 1250. For example, the CAM PHY 1250 may include a content addressable memory (CAM). As an example, the CAM may include a non-volatile memory. That is, the CAM may include the non-volatile memory, which retains data regardless of whether power to the non-volatile memory is turned on or off. The CAM PHY 1250 may store data patterns in the CAM. The CAM PHY 1250 may use data DATA received through the data pad DQ as an address of the CAM. The CAM PHY 1250 may store a data pattern stored in the CAM corresponding to the data DATA in a memory cell array of the memory device 1200. The data pattern stored in the CAM may include a capacity larger than a unit of the corresponding data DATA. Accordingly, the memory device 1200 may use external data pads DQs (or an external bandwidth) less than internal data paths (or an internal bandwidth) between the CAM PHY 1250 and the memory cell array of the memory device 1200. That is, the memory device 1200 may use an external bandwidth smaller than an actual internal bandwidth to exchange data of the same capacity with the memory controller 1100. Accordingly, the memory device 1200 may reduce an amount of heat generated by data exchanged through the external data pads DQs.

According to an example embodiment, the memory controller 1100 may include a CAM PHY (CAM PHY) 1150 using the same protocol as the CAM PHY 1250 of the memory device 1200. For example, the CAM PHY 1150 of the memory controller 1100 may store the same data pattern as the data pattern stored in the CAM PHY 1250 of the memory device 1200. The CAM PHY 1150 of the memory controller 1100 may encode an original data to be transmitted into the data DATA based on the data pattern stored in the CAM PHY 1250 of the memory device 1200. The CAM PHY 1250 of the memory device 1200 may decode the data DATA and store the data pattern corresponding to the data DATA in the memory cell array of the memory device 1200. The memory controller 1100 may transmit or receive the data DATA through controller data pads CDQs. The number of the controller data pads CDQs may be less than the number of internal data paths of the memory controller 1100.

Figure 2:
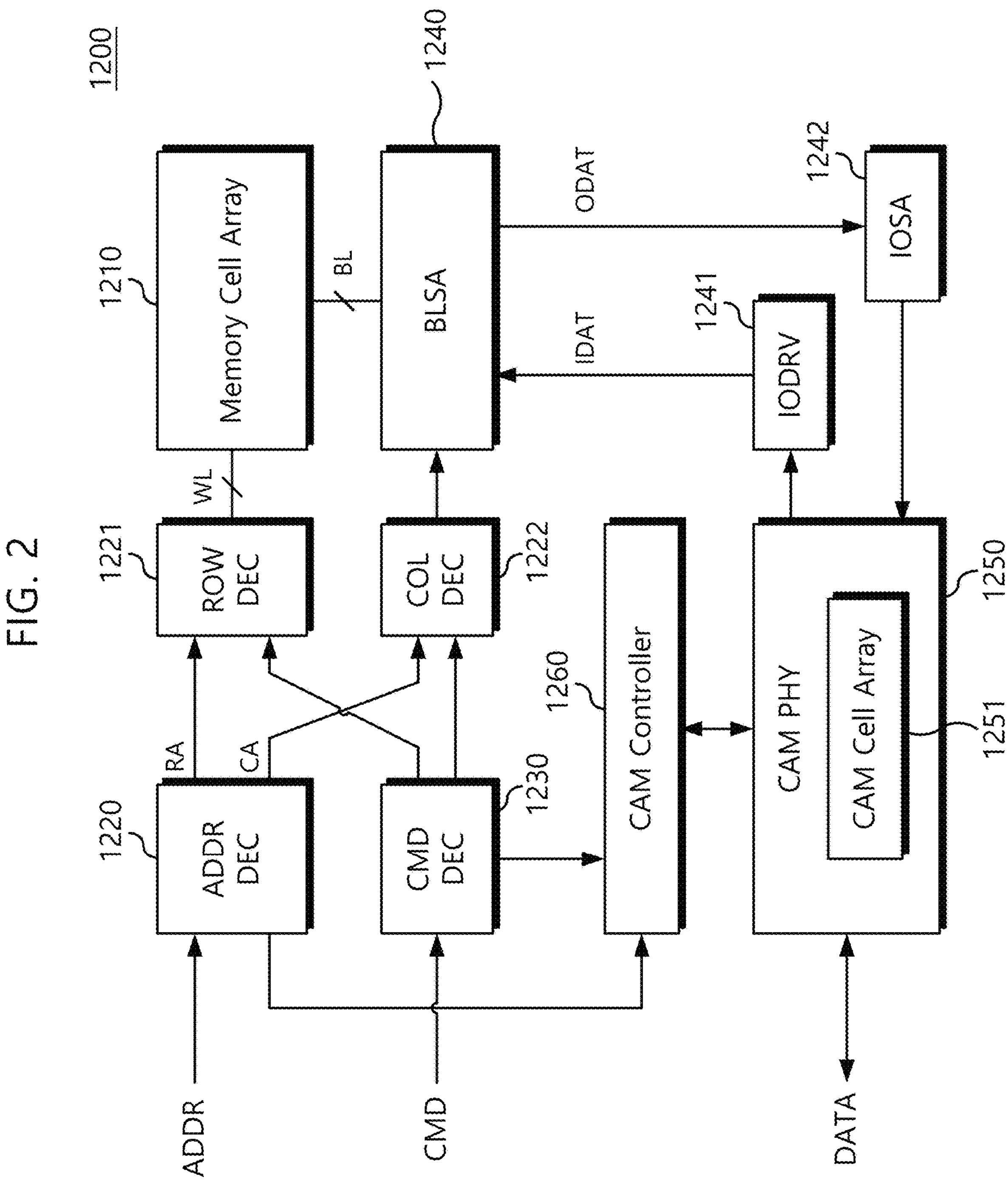
FIG. 2 is a block diagram illustrating a memory device of FIG. 1.

FIG. 2 is a block diagram illustrating a memory device of FIG. 1. Referring to FIG. 2, the memory device 1200 may include a memory cell array 1210, an address decoder (ADDR DEC) 1220, a row decoder (ROW DEC) 1221, a column decoder (COL DEC) 1222, a command decoder (CMD DEC) 1230, a bitline sense amplifier (BLSA) 1240, an input/output driver (IODRV) 1241, an input/output sense amplifier (IOSA) 1242, a CAM PHY (CAM PHY) 1250 and a CAM controller 1260. However, the disclosure is not limited thereto, and as such, according to other embodiments, the memory device 1200 may include one or more other components in addition to the components illustrated in FIG. 2, or may omit one or more components illustrated in FIG. 2. Also, according to an embodiment, one or more components illustrated in FIG. 2 may be combined.

According to an example embodiment, the memory cell array 1210 may include a plurality of memory cells arranged in a matrix of rows and columns. For example, the memory cell array 1210 may include a plurality of wordlines WL and a plurality of bitlines BL connected to memory cells. The plurality of wordlines WL may be connected to rows of the memory cells, and the plurality of bitlines BL may be connected to columns of the memory cells.

According to an example embodiment, the address decoder 1220 may receive an address ADDR from the memory controller 1100 of FIG. 1. For example, the address ADDR may include a row address RA indicating or identifying a row of the memory cell array 1210 and a column address CA indicating or identifying a column of the memory cell array 1210. The address decoder 1220 may transmit the row address RA to the row decoder 1221 and may transmit the column address CA to the column decoder 1222.

According to an example embodiment, the row decoder 1221 may select one of the plurality of wordlines WL connected to the memory cell array 1210. For example, the row decoder 1221 may decode the row address RA received from the address decoder 1220, select a wordline corresponding to the row address RA and activate the selected wordline. Here, the row decoder 1221 may select a single wordline based on the row address RA decoded by the address decoder 1220.

According to an example embodiment, the column decoder 1222 may select a bitline from among the plurality of bitlines BL of the memory cell array 1210. The column decoder 1222 may decode the column address CA, received from the address decoder 1220, to select the bitline BL corresponding to the column address CA.

According to an example embodiment, the command decoder 1230 may decode the command CMD signal received from the memory controller to generate control signals. The control signals may include, but is not limited to, a write enable signal/WE, a row address strobe signal/RAS, a column address strobe signal/CAS, and a chip select signal/CS. According to an embodiment, one or more of the control signals may be transmitted to the row decoding 1221, column decoder 1222, the CAM controller 1260 or other components of the memory device 1200. The command CMD may include an active request, a read request, a write request, or a precharge request. The command decoder 1230 may control overall operations of the row decoder 1221, the column decoder 1222 and the bitline sense amplifier 1240 through the control signals corresponding to the command CMD.

According to an example embodiment, the bitline sense amplifier 1240 may be connected to the bitlines BL of the memory cell array 1210. For example, the bitline sense amplifier 1240 may sense a change in voltage of a selected bitline, among the plurality of bitlines BL, and may amplify and output the change in voltage.

According to an example embodiment, the input/output driver 1241 may store a data pattern received from the CAM PHY 1250 as output-data ODAT in the memory cell array 1210. For example, the input/output driver 1241 may be connected to the CAM PHY 1250 through internal input paths.

According to an example embodiment, the input/output sense amplifier 1242 may transmit output-data ODAT to the CAM PHY 1250 based on a voltage sensed and amplified by the bitline sense amplifier 1240. For example, the input/output sense amplifier 1242 may be connected to the CAM PHY 1250 through internal output paths.

According to an example embodiment, the CAM PHY 1250 may store data patterns in a CAM cell array 1251. For example, frequently used data patterns may be stored in the CAM cell array 1251 in advance by the user.

According to an example embodiment, the CAM PHY 1250 may output input-data IDAT based on data DATA received from an external device (for example, the memory controller 1100). For example, the data DATA may be used as an address of the CAM cell array 1251. The CAM PHY 1250 may transmit the data DATA to the CAM controller 1260. The CAM controller 1260 may control the CAM PHY 1250 to output a data pattern of the CAM cell array 1251 corresponding to the data DATA.

According to an example embodiment, the CAM PHY 1250 may output data DATA corresponding to output-data ODAT to the external device (for example, the memory controller 1100). In an example case in which a read request is received from the memory controller 1100, the memory cell array 1210 may output data corresponding to the read request. The bitline sense amplifier 1240 and the input/output sense amplifier 1242 may transmit data read from the memory cell array 1210 as the output-data ODAT to the CAM PHY 1250. The CAM PHY 1250 may compare the output-data ODAT with data patterns stored in the CAM cell array 1251. The CAM PHY 1250 may externally output an address of a data pattern matching the output-data ODAT as data DATA through a data pad DQ.

According to an example embodiment, the CAM controller 1260 may control an overall operation of the CAM PHY 1250. In an example case in which data DATA and a write request are received from the memory controller 1100, the CAM controller 1260 may control the CAM PHY 1250 to output a data pattern of the CAM cell array 1251 corresponding to the data DATA. In an example case in which a read request is received from the memory controller 1100, the CAM controller 1260 may control the CAM PHY 1250 to output an address of data pattern matched by comparing the output-data ODAT with the data patterns stored in the CAM cell array 1251 as data DATA. In an example case in which data DATA and a data pattern storing request are received from the memory controller 1100, the CAM controller 1260 may control the CAM PHY 1250 to store the received data DATA as a data pattern in the CAM cell array 1251.

As described above, the CAM PHY 1250 may store data patterns corresponding to data DATA received from the memory controller 1100 in the CAM cell array 1251. The CAM PHY 1250 may convert the data DATA into the data pattern stored in the CAM cell array 1251 and convert the data pattern into the data DATA. Additionally, a data pattern stored in the CAM cell array 1251 may include a capacity larger than a unit of corresponding data DATA. Accordingly, the memory device 1200 may use external data pads DQs less than internal data paths (for example, internal input paths or internal output paths) between the CAM PHY 1250 and the memory cell array 1210.

That is, the memory device 1200 may use an external bandwidth smaller than an actual internal bandwidth to exchange data of the same capacity as the memory controller 1100. Accordingly, the memory device 1200 may reduce an amount of heat generated through the external data pads DQ.

Figure 3:
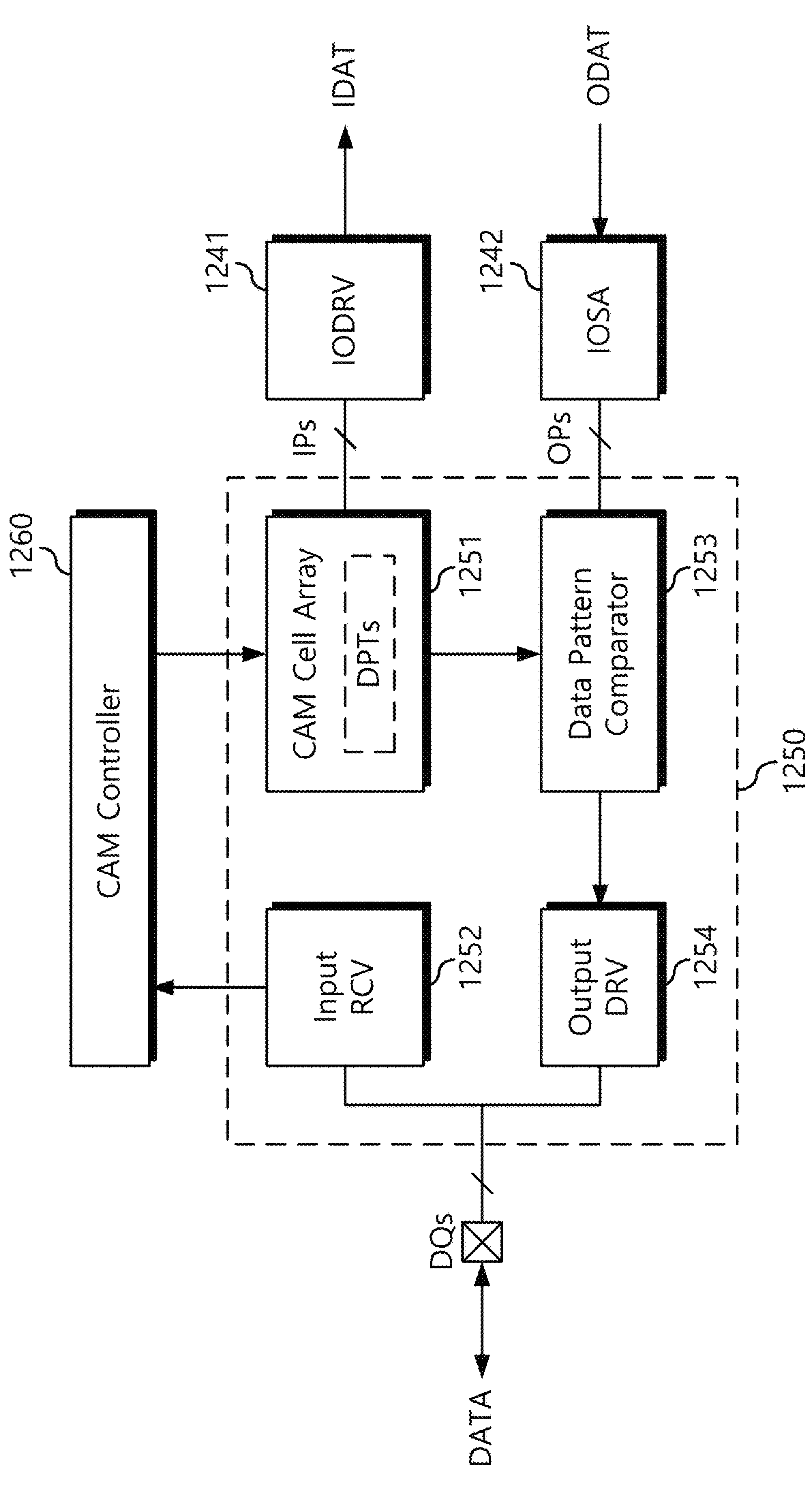
FIG. 3 is a block diagram illustrating a content addressable memory physical layer of FIG. 2.

FIG. 3 is a block diagram illustrating a CAM PHY of FIG. 2. Referring to FIGS. 2 and 3, a CAM PHY 1250 may include a CAM cell array 1251, an input receiver (RCV) 1252, a data pattern comparator 1253, and an output driver (DRV) 1254.

According to an example embodiment, the CAM PHY 1250 may perform a pattern write operation. For example, the memory device 1200 may store data patterns DPTs to be used in a general write or read operation in the CAM cell array 1251. Here, the general write or read operation may also be referred to as normal write or read operation in which the memory controller performs access operation to access (e.g., read or write) data in the memory cell array 1210. For example, in a pattern write operation, which may occur before the general write or read operation, the memory device 1200 may store a plurality of data patterns DPTs. However, the disclosure is not limited thereto, and as such, the pattern write operation may occur at other times to update the CAM cell array 1251. For example, according to an embodiment, the pattern write operation may occur during or after the general write or read operation to update the CAM cell array 1251 for future general write or read operations. The memory device 1200 may receive a pattern write command and a CAM address from the memory controller 1100. The CAM controller 1260 may receive a pattern write flag through the command decoder 1230. The CAM controller 1260 may receive a CAM address through the address decoder 1220. The CAM controller 1260 may determine that an address received along with the pattern write flag is the CAM address. The CAM controller 1260 may select CAM cells of the CAM cell array 1251 which correspond to the CAM address. The memory device 1200 may receive data DATA through data pads DQs. The input receiver 1252 may transmit the data DATA to the CAM controller 1260. The CAM controller 1260 may store the data DATA in the selected CAM cells. For example, the CAM controller 1260 may store the data DATA in the CAM cells corresponding to the received CAM address.

According to an example embodiment, the CAM PHY 1250 may convert (or decode) data DATA received from the memory controller 1100 during a general write operation into input-data IDAT to be stored in the memory cell array 1210. For example, the memory device 1200 may receive a write command and a normal address from the memory controller 1100. The CAM controller 1260 may receive a write flag through the command decoder 1230. The memory device 1200 may receive data DATA through the data pads DQs. The input receiver 1252 may transmit the data DATA to the CAM controller 1260. The CAM controller 1260 may obtain a CAM address of the CAM cell array 1251 from the data DATA. The CAM controller 1260 may control the CAM cell array 1251 to output a data pattern corresponding to the CAM address. The data pattern may be transmitted to the input/output driver 1241 through internal input paths IPs. The input/output driver 1241 may transmit the data pattern as input-data IDAT to the memory cell array 1210. The memory cell array 1210 may store the input-data IDAT in the normal address.

According to an example embodiment, the CAM PHY 1250 may convert (or encode) output-data ODAT read from the memory cell array 1210 during a general read operation into data DATA to be transmitted to the memory controller 1100. For example, the memory device 1200 may receive a read command and a normal address from the memory controller 1100. The memory cell array 1210 and the bitline sense amplifier 1240 may transmit the output-data ODAT corresponding to the normal address to the input/output sense amplifier 1242. The input/output sense amplifier 1242 may transmit the output-data ODAT to the data pattern comparator 1253 through internal output paths OPs. The data pattern comparator 1253 may compare the output-data ODAT with data patterns DPTs stored in the CAM cell array 1251. The data pattern comparator 1253 may transmit a CAM address corresponding to a data pattern matched by comparing the output-data ODAT with the data patterns DPTs to the output driver 1254. According to an embodiment, the data pattern that is matched may be a data pattern with the smallest number of bits different from the output-data ODAT among the data patterns DPTs. The output driver 1254 may transmit the determined CAM address through the data paths DQs.

FIG. 4 is a table illustrating an example of data patterns stored in a CAM cell array according to an embodiment. Referring to FIGS. 2 to 4, the CAM cell array 1251 may store data patterns DPTs corresponding to CAM addresses.

According to an example embodiment, the CAM cell array 1251 may store data patterns DPTs having specific data patterns. For example, the data patterns DPTs may be set or specified by the user. The data patterns DPTs may be stored in the CAM cell array 1251 through a pattern write operation. The data patterns DPTs may be set as frequently used patterns in the memory system 1000. As an example, in FIG. 4, the data patterns DPTs may include a first data pattern DPT1 to a sixteenth data pattern DPT16. The first data pattern DPT1 to the sixteenth data pattern DPT16 may correspond to a first CAM address CADDR1 to a sixteenth CAM address CADDR16, respectively. Each data pattern may has a structure which repeats each CAM address four times. However, this is an example, and each data pattern may be configured in various ways depending on setting of the user.

According to an example embodiment, a data pattern may be configured to have a capacity larger than a CAM address. The CAM address may include the number of bits corresponding to the number of the data pads DQs. The data pattern may include the number of bits corresponding to the number of internal data paths (for example, the internal input paths IPs or the internal output paths OPs). For example, in FIG. 4, the CAM address (for example, each of the first CAM address CADDR1 to the sixteenth CAM address CADDR16) may include four bits. The data pattern (for example, each of the first data pattern DPT1 to the sixteenth data pattern DPT16) may include sixteen bits. As an example, the number of the external data pads DQs may be smaller than the number of the internal data paths (for example, the internal input paths IPs or the internal output paths OPs). As another example, the number of the internal data paths (for example, the internal input paths IPs or the internal output paths OPs) may be configured as an integer multiple of the number of the external data pads DQs. In FIG. 4, the CAM address may be exchanged with the memory controller 1100 through four data pads (DQ0, DQ1, DQ2, and DQ3). The data pattern may be exchanged with the memory cell array 1210 through sixteen internal data paths (P0, P1, P2, P3, P4, P5, P6, P7, P8, P9, P10, P11, P12, P13, P14, P15). Accordingly, the memory device 1200 may reduce an amount of heat generated from the data pads DQs compared to a data capacity stored in the memory cell array 1210. Although FIG. 4 illustrates that the CAM address may include four bits and the data pattern may include sixteen bits, the disclosure is not limited thereto. As such, according to another embodiment, the CAM address may be greater than four bits or less than four bits, and the data pattern may be greater than sixteen bits or less than sixteen bits.

Figure 5:
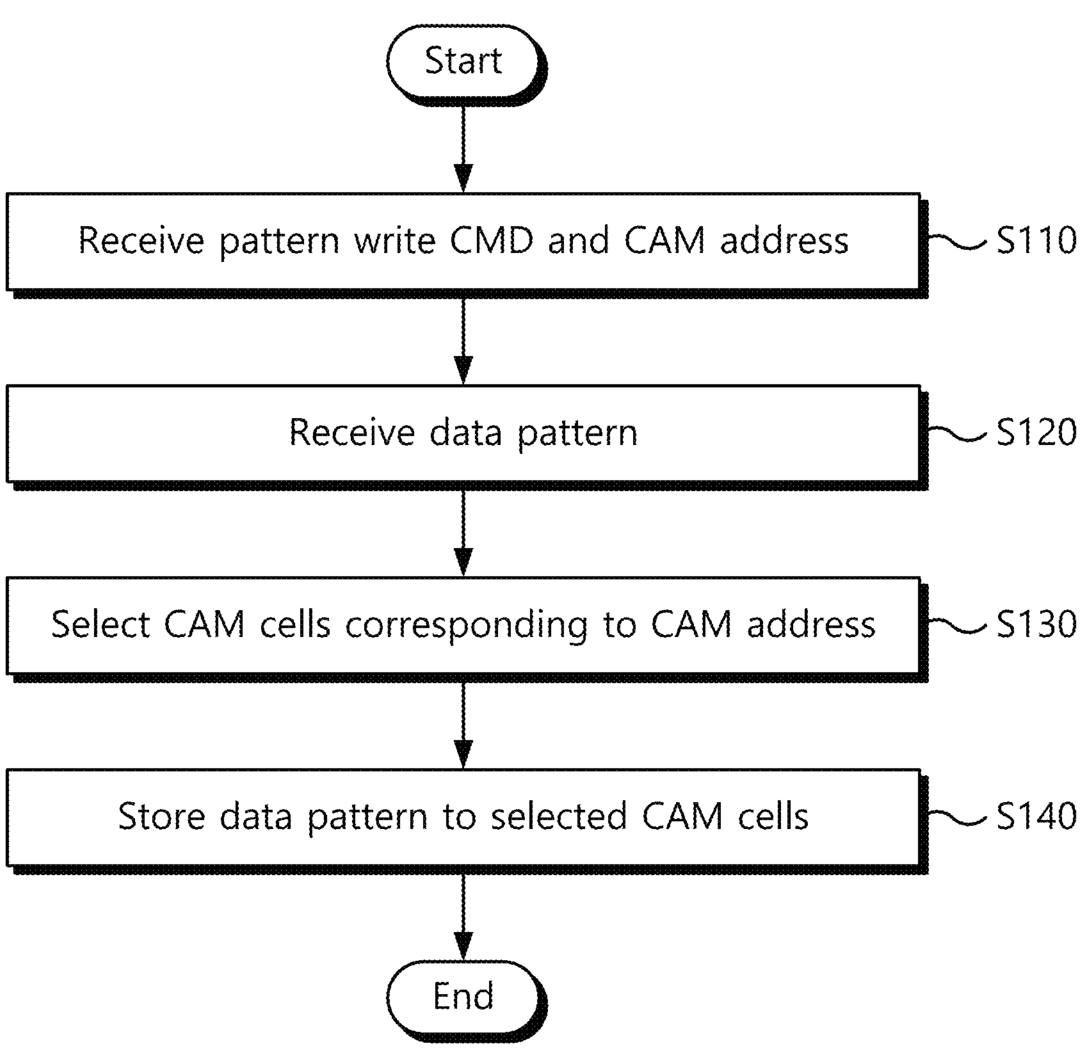
FIG. 5 is a flowchart illustrating a pattern write operation of a memory device of FIG. 2.

FIG. 5 is a flowchart illustrating a pattern write operation of a memory device of FIG. 2. FIG. 6 is a diagram illustrating data flow during a pattern write operation of FIG. 5. Referring to FIGS. 2, 5 and 6, the memory device 1200 may store data patterns DPTs in the CAM cell array 1251. The memory device 1200 may store data patterns DPTs to be used in a general write or read operation in the CAM cell array 1251 before the general write or read operation.

According to an example embodiment, in operation S110, the method may include receiving information (or instruction) for writing a data pattern into a CAM cell array 1251. For example, the memory device 1200 may receive a pattern write command PWC and a CAM address CADDR. For example, the command decoder 1230 may receive the pattern write command PWC from the memory controller 1100. The command decoder 1230 may transmit a pattern write flag PWF to the CAM controller 1260 based on the pattern write command PWC. The address decoder 1220 may receive the CAM address CADDR from the memory controller 1100. The address decoder 1220 may transmit the CAM address CADDR to the CAM controller 1260.

According to an example embodiment, in operation S120, the method may include receiving a data pattern. For example, the memory device 1200 may receive a data pattern DPT from the memory controller 1100. For example, the memory device 1200 may receive the data pattern DPT through the data pads DQs. The input receiver 1252 may transmit the data pattern DPT to the CAM controller 1260.

According to an example embodiment, in operation S130, the method may include selecting a plurality of CAM cells in the CAM cell array 1251 corresponding to the CAM address CADDR. For example, the memory device 1200 may select CAM cells of the CAM cell array 1251 corresponding to the CAM address CADDR. For example, the CAM controller 1260 may receive the pattern write flag PWF from the command decoder 1230. The CAM controller 1260 may receive the CAM address CADDR from the address decoder 1220. The CAM controller 1260 may determine a address received along with the pattern write flag PWF to be the CAM address CADDR. The CAM controller 1260 may select CAM cells of the CAM cell array 1251 corresponding to the CAM address CADDR.

According to an example embodiment, in operation S140, the method may include storing the data pattern in the selected CAM cells. For example, the memory device 1200 may store the received data pattern DPT in the selected CAM cells. For example, the CAM controller 1260 may store the data pattern DPT received from the input receiver 1252 in the selected CAM cells. Since a size of one data pattern is larger than a bandwidth of the data pads DQs, the data pattern DPT may be divided into a plurality of pieces and received through the data pads DQs.

According to an example embodiment, the number of the data patterns DPTs (for example, the first data pattern DPT1 to the sixteenth data pattern DPT16 of FIG. 4) may initially be the number of the CAM addresses CADDR (for example, the first CAM address CADDR1 to the sixteenth CAM address CADDR16 of FIG. 4). Afterwards, each of the data patterns DPTs may be updated for each CAM address.

Figure 7:
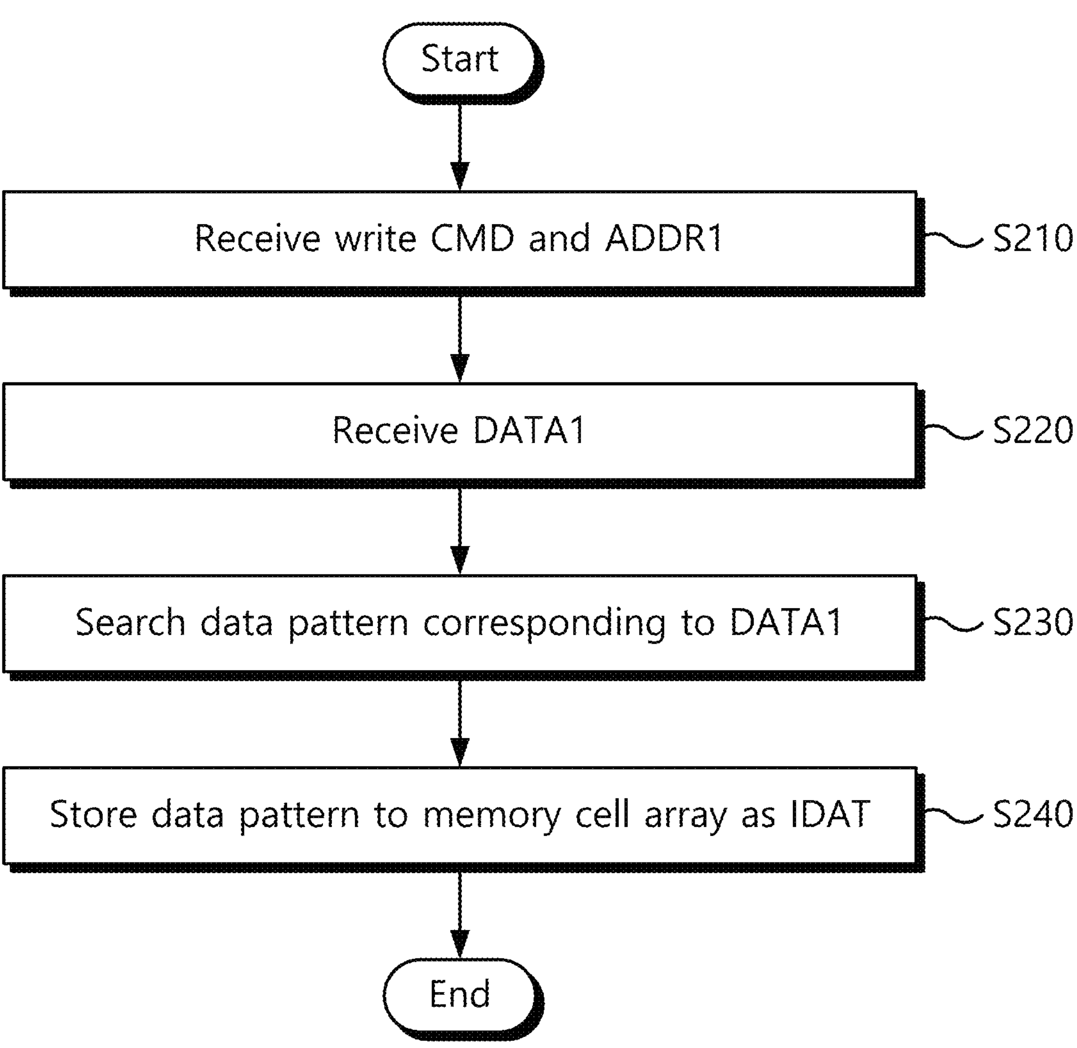
FIG. 7 is a flowchart illustrating a write operation of a memory device of FIG. 2.

FIG. 7 is a flowchart illustrating a write operation of a memory device of FIG. 2. FIG. 8 is a diagram illustrating data flow during a write operation of FIG. 7. Referring to FIGS. 2, 7 and 8, the memory device 1200 may perform a general write operation. The memory device 1200 may convert (or decode) first data DATA1 received from the memory controller 1100 into input-data IDAT to be stored in the memory cell array 1210 during a general write operation.

According to an example embodiment, in operation S210, the method may include receiving information or instruction to perform a write operation. For example, the memory device 1200 may receive a write command WR and a first address ADDR1 from the memory controller 1100. For example, the command decoder 1230 may receive the write command WR from the memory controller 1100. The command decoder 1230 may transmit a write flag WRF to the CAM controller 1260 based on the write command WR. The address decoder 1220 may receive the first address ADDR1 from the memory controller 1100. The address decoder 1220 may decode the first address ADDR1 to transmit the first row address RA1 to the row decoder 1221 and transmit the first column address CA1 to the column decoder 1222.

According to an example embodiment, in operation S220, the method may include receiving data (e.g., write data) to be written into the memory cell array of the memory device. For example, the memory device 1200 may receive first data DATA1 from the memory controller 1100. For example, the memory device 1200 may receive the first data DATA1 through the data pads DQs. The input receiver 1252 may transmit the first data DATA1 to the CAM controller 1260.

According to an example embodiment, in operation S230, the method may include obtaining data pattern corresponding to the write data. For example, the memory device 1200 may search a data pattern DPT corresponding to the first data DATA1 in the CAM cell array 1251. For example, the CAM controller 1260 may receive the write flag WRF from the command decoder 1230. In an example case in which the write flag WRF is received, the CAM controller 1260 may obtain the CAM address CADDR of the CAM cell array 1251 from the first data DATA1. The CAM controller 1260 may control the CAM cell array 1251 to output the data pattern DPT corresponding to the CAM address CADDR through the internal input paths IPs.

According to an example embodiment, in operation S240, the method may include storing the data pattern to the memory cell array of the memory device. For example, the memory device 1200 may store the data pattern DPT output from the CAM cell array 1251 as input-data IDAT in the memory cell array 1210. For example, the input/output driver 1241 may transmit the data pattern DPT as the input-data IDAT to the memory cell array 1210. The memory cell array 1210 may store the input-data IDAT in the first address ADDR1 (for example, memory cells corresponding to the first row address RA1 and the first column address CA1).

According to an example embodiment, the memory controller 1100 may transmit the first data DATA1 to the memory device 1200. For example, the memory controller 1100 may encode the same original data as the input-data IDAT in the first data DATA1, which is used to access the data pattern in the CAM cell array 1251. The memory device 1200 may decode the first data DATA1 through the CAM PHY 1250 and store the original data in the memory cell array 1210. Accordingly, the memory controller 1100 may obtain an effect of transmitting the original data by transmitting the first data DATA1 with a smaller capacity than the original data. Through the smaller number of the data pads DQs than the internal input paths IPs, the memory device 1200 may obtain the effect of receiving original data. Accordingly, the memory device 1200 may reduce an amount of heat generated by the data pads DQs compared to the capacity of the original data.

Figure 9:
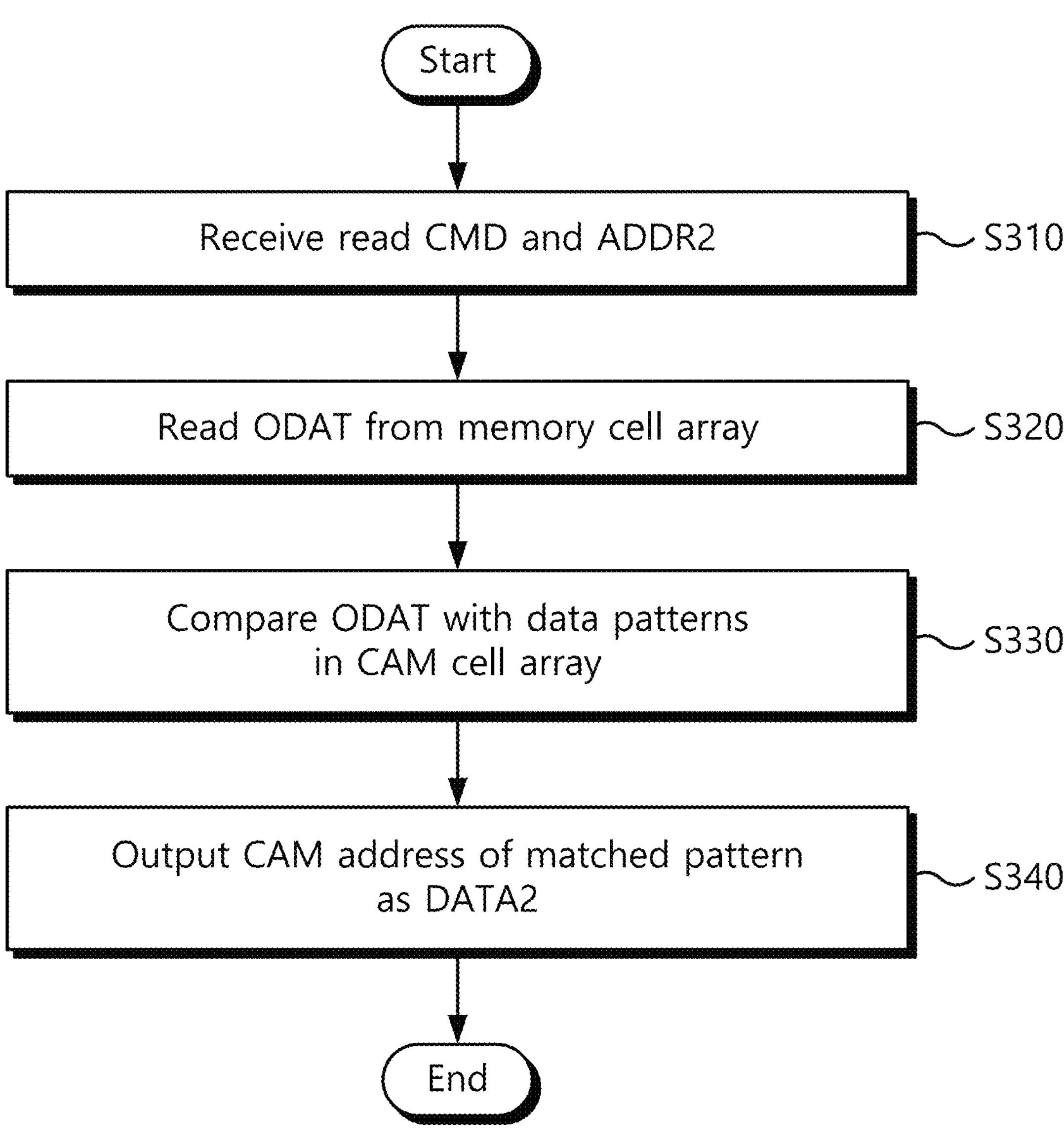
FIG. 9 is a flowchart illustrating a read operation of a memory device of FIG. 2.
Figure 10:
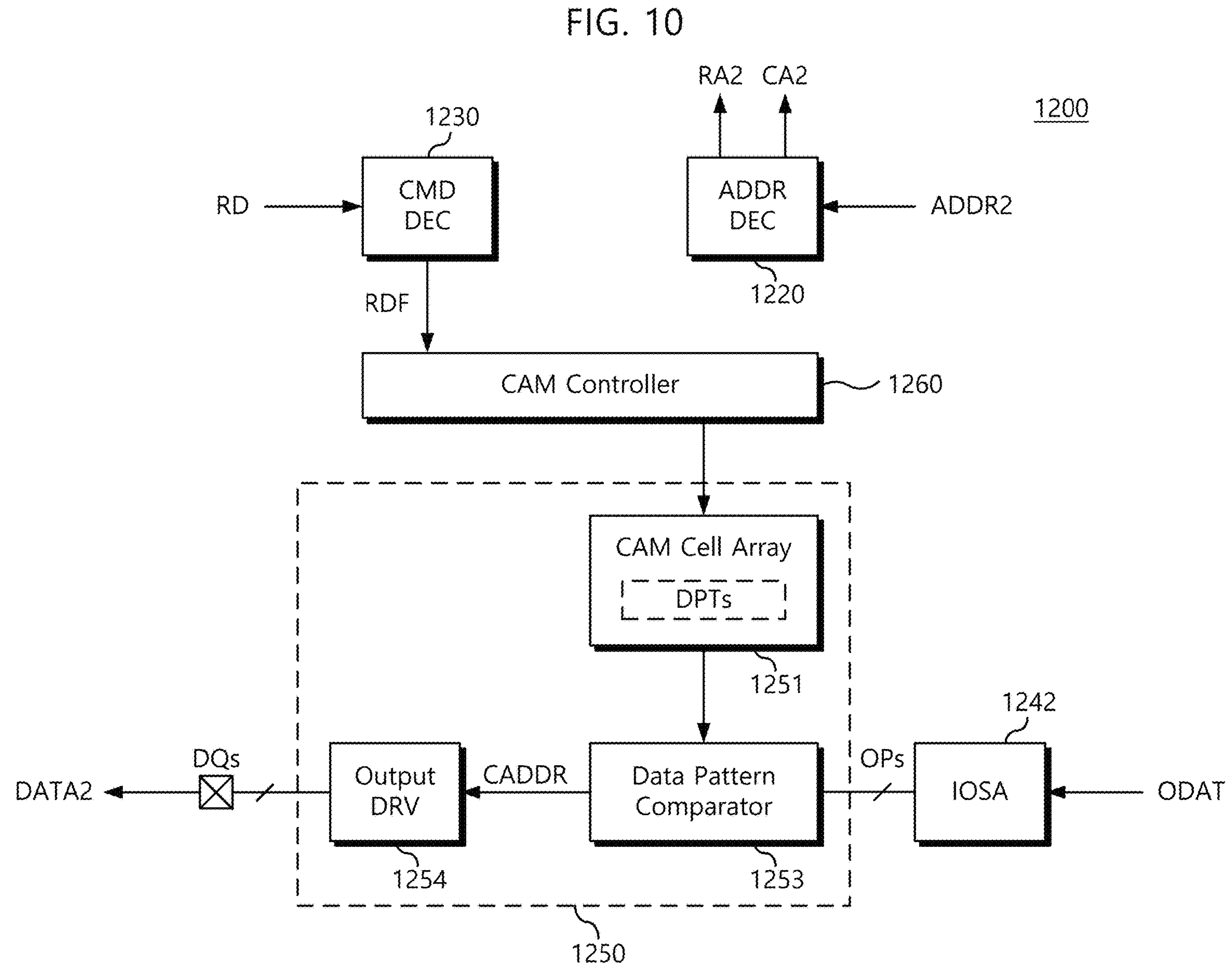
FIG. 10 is a diagram illustrating data flow during a read operation of FIG. 9.

FIG. 9 is a flowchart illustrating a read operation of a memory device of FIG. 2. FIG. 10 is a diagram illustrating data flow during a read operation of FIG. 9. Referring to FIGS. 2, 9 and 10, the memory device 1200 may perform a general read operation. The memory device 1200 may convert (or encode) output-data ODAT read from the memory cell array 1210 into second data DATA2 to be transmitted to the memory controller 1100 during the general read operation.

According to an example embodiment, in operation S310, the method may include receiving information or instruction to perform a read operation. For example, the memory device 1200 may receive a read command RD and a second address ADDR2 from the memory controller 1100. For example, the command decoder 1230 may receive the read command RD from the memory controller 1100. The command decoder 1230 may transmit a read flag RDF to the CAM controller 1260 based on the read command RD. The address decoder 1220 may receive the second address ADDR2 from the memory controller 1100. The address decoder 1220 may decode the second address ADDR2 to transmit the second row address RA2 to the row decoder 1221 and transmit the second column address CA2 to the column decoder 1222.

According to an example embodiment, in operation S320, the method may include reading data from the memory cell array of the memory device based on the address received from the memory controller. For example, the memory device 1200 may read the output-data ODAT from the memory cell array 1210. For example, the memory cell array 1210 and the bitline sense amplifier 1240 may transmit the output-data ODAT corresponding to the second address ADDR2 (for example, memory cells corresponding to the second row address RA2 and the second column address CA2) to the input/output sense amplifier 1242. The input/output sense amplifier 1242 may transmit the output-data ODAT to the data pattern comparator 1253 through the internal output paths OPs.

According to an example embodiment, in operation S330, the method may include comparing the data read from the memory cell array with the memory patterns in the CAM cell array. For example, the memory device 1200 may compare the output-data ODAT with data patterns DPTs stored in the CAM cell array 1251. For example, the CAM controller 1260 may receive the read flag RDF. In an example case in which the read flag RDF is received, the CAM controller 1260 may control the CAM cell array 1251 to provide the data patterns DPTs to the data pattern comparator 1253. The data pattern comparator 1253 may select a data pattern (hereinafter referred to a matching pattern) which matches the output-data ODAT among the data patterns DPTs. As an example, the data pattern comparator 1253 may select the data pattern with the smallest number of bits different from the output-data ODAT as the matching pattern. Accordingly, the CAM PHY 1250 may have a function to restore errors in bit units. The data pattern comparator 1253 may transmit a CAM address CADDR corresponding to the matching pattern to the output driver 1254.

According to an example embodiment, in operation S340, the method may include obtaining a CAM address of a data pattern matching the data read from the memory cell array. For example, the memory device 1200 may output the CAM address CADDR of the matching pattern as second data DATA2. For example, the output driver 1254 may transmit the determined CAM address CADDR as the second data DATA2 to the memory controller 1100 through the data paths DQs.

According to an example embodiment, the memory device 1200 may transmit the second data DATA2 encoding the output-data ODAT to the memory controller 1100. The memory controller 1100 may obtain data identical to the output-data ODAT (or the matching pattern) by decoding the second data DATA2. Accordingly, the memory device 1200 may achieve an effect of transmitting the output-data ODAT by transmitting the second data DATA2 with a smaller capacity than the output-data ODAT. Through the smaller number of data pads DQs than the number of the internal output paths OPs, the memory device 1200 may obtain an effect of transmitting the output-data ODAT. Accordingly, the memory device 1200 may reduce an amount of heat generated by the data pads DQs compared to a capacity of the output-data ODAT. Additionally, during the encoding process of the output-data ODAT, the data pattern comparator 1253 may output the second data DATA2 which is corrected even if a bit-wise error exists in the output-data ODAT. Accordingly, the CAM PHY 1250 may include a bit-level error recovery function.

Figure 11:
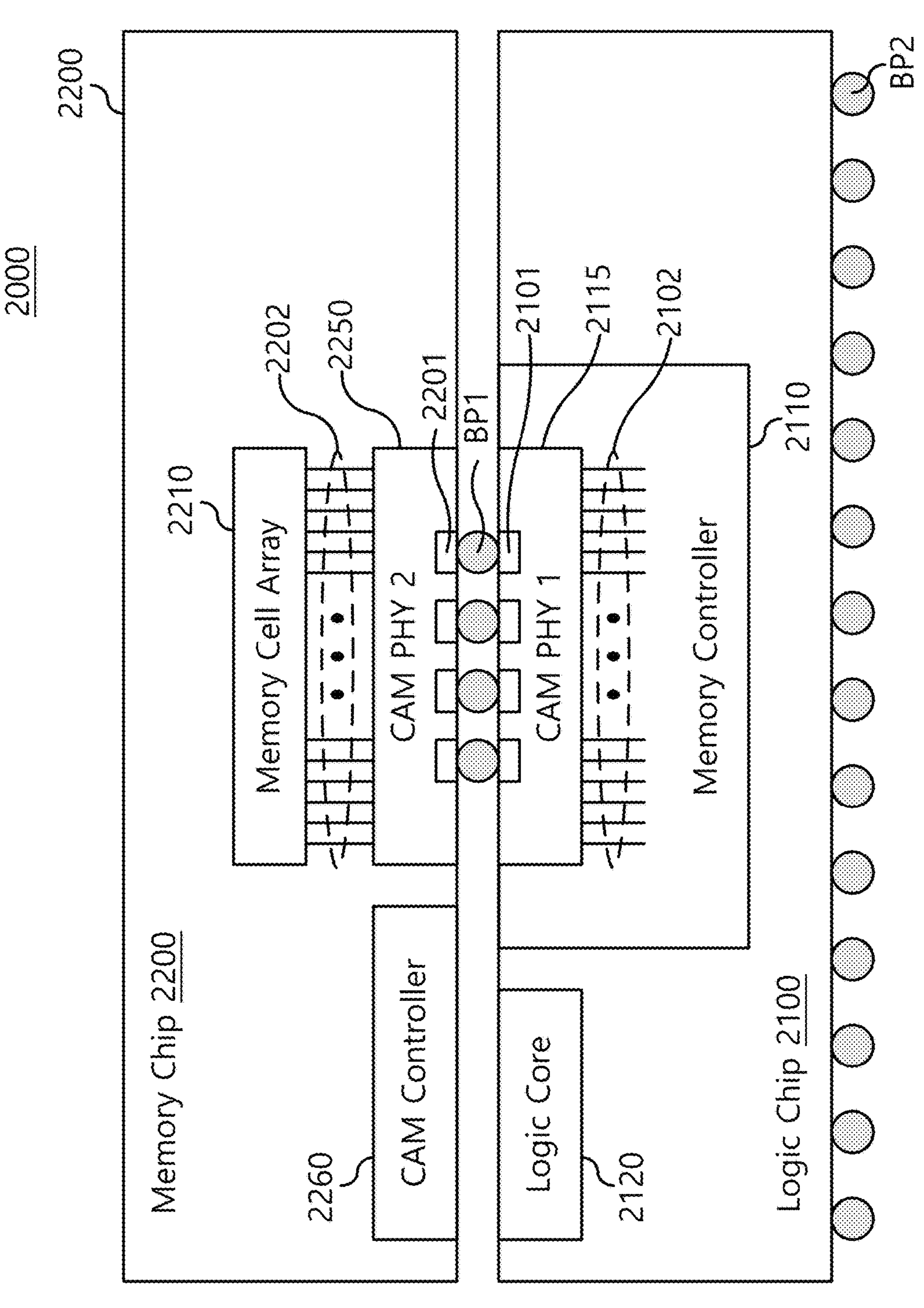
FIG. 11 is a diagram illustrating a three-dimensionally stacked memory system according to an embodiment.

FIG. 11 is a diagram illustrating a three-dimensionally stacked memory system according to an embodiment. Referring to FIG. 11, the memory system 2000 may include a logic chip 2100 and a memory chip 2200. The logic chip 2100 may be electrically connected to the memory chip 2200 through first bumps BP1. The first bumps BP1 may electrically connect controller data pads 2101 and memory data pads 2201, respectively. For example, each one of the first bumps BP1 may electrically connect one of the controller data pads 2101 with one of the memory data pads 2201. The logic chip 2100 may be electrically connected to external components (or package external connection pins)

through the second bumps BP2. For example, the logic chip 2100 may be electrically connected to package external connection pins through the second bumps BP2.

According to an example embodiment, the logic chip 2100 may include a memory controller 2110 and a logic core 2120. The memory controller 2110 and a logic core 2120 may be implemented by various electronic components and/or electronic circuitry. For example, the memory controller 2110 may include the same or similar configurations and features as the memory controller 1100 of FIG. 1. Accordingly, descriptions of configurations and features which are the same or similar to those of the memory controller 1100 of FIG. 1 will be omitted. The memory controller 2110 may include a first CAM PHY 2115. The first CAM PHY 2115 may convert data between the controller data pads 2101 and controller internal paths 2102. The first CAM PHY 2115 may include a CAM cell array and a data pattern comparator. The memory controller 2110 may include a CAM controller which controls the first CAM PHY 2115. The first CAM PHY 2115 may include the same or similar configurations and features as the CAM PHY 1150 of FIG. 1. Accordingly, descriptions of the same or similar configurations and features as the CAM PHY 1150 of FIG. 1 will be omitted.

According to an example embodiment, the memory chip 2200 may include a memory cell array 2210, a second CAM PHY 2250 and a CAM controller 2260. For example, the memory chip 2200 may include the same or similar configurations and features as the memory device 1200 of FIG. 1. Accordingly, descriptions of configurations and features which are the same or similar to those of the memory device 1200 of FIG. 1 will be omitted. The second CAM PHY 2250 may convert data between the memory data pads 2201 and memory internal paths 2202. The second CAM PHY 2250 may include a CAM cell array and a data pattern comparator. The second CAM PHY 2250 may include the same or similar configurations and features as the CAM PHY 1250 of FIG. 2. Accordingly, descriptions of the same or similar configurations and features as the CAM PHY 1250 of FIG. 2 will be omitted. The CAM controller 2260 may control an overall operation of the second CAM PHY 2250 during a pattern write operation, a general write operation or a general read operation. The CAM controller 2260 may include the same or similar configurations and features as the CAM controller 1260 of FIG. 2. Accordingly, descriptions of the same or similar configurations and features as the CAM controller 1260 of FIG. 2 will be omitted.

As described above, the logic chip 2100 and the memory chip 2200 may be connected through external data pads (for example, the controller data pads 2101 or the memory data pads 2201) less than internal data paths (for example, the controller internal paths 2102 or the memory internal paths 2202). When transmitting and receiving data, encoded data may be exchanged through the smaller number of external data pads compared to the data capacity actually used inside the logic chip 2100 or the memory chip 2200. Accordingly, an amount of heat generated from external data pads may be reduced compared to a data capacity actually used inside the logic chip 2100 or the memory chip 2200.

According to an embodiment of the disclosure, the memory device may use a smaller number of external data pads compared to internal data paths of the memory device through data conversion using a CAM.

According to an embodiment of the disclosure, an amount of heat generated by the external data pads of the memory device may be reduced as the number of external data pads decreases.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A memory device comprising:

a memory cell array comprising memory cells;

an address decoder configured to output address information based on a memory address of the memory cell array received from an external device;

a command decoder configured to generate a memory access signal based on a command received from the external device;

a content addressable memory (CAM) cell array configured to store a plurality of data patterns and a plurality of CAM addresses corresponding to the plurality of data patterns, respectively; and a CAM physical layer connected to a plurality of external data pads, the CAM physical layer configured to:

based on the memory access signal being a write operation signal, receive first data through the plurality of external data pads, the first data comprising a first CAM address, select a first data pattern from among the plurality of data patterns based on the first CAM address, and transmit the selected first data pattern as input data to first memory cells of the memory cell array corresponding to the address information, and based on the memory access signal being a read operation signal, compare output data from the memory cell array with the plurality of data patterns based on the address information, and output a second CAM address corresponding to a second data pattern matching the output data as second data through the plurality of external data pads.

2. The memory device of claim 1, wherein a number of the plurality of external data pads is less than a number of internal data paths between the CAM physical layer and the memory cell array.

3. The memory device of claim 1, wherein a number of internal data paths between the CAM physical layer and the memory cell array is an integer multiple of a number of the plurality of external data pads.

4. The memory device of claim 1, further comprising:

a CAM controller configured to control an operation of the CAM physical layer based on a command flag corresponding to the command received from the command decoder.

5. The memory device of claim 4, wherein the command decoder is configured to transmit a pattern write flag to the CAM controller based on a pattern write command, wherein the address decoder is configured to transmit a third CAM address to the CAM controller based on receiving the third CAM address corresponding to the pattern write command, wherein the CAM physical layer is configured to transmit an input data pattern received from the plurality of external data pads to the CAM controller, and wherein the CAM controller is configured to store the input data pattern in CAM cells of the CAM cell array corresponding to the third CAM address based on receiving the pattern write flag.

6. The memory device of claim 4, wherein the CAM physical layer comprises an input receiver configured to transmit the first data received from the plurality of external data pads to the CAM controller, wherein the command decoder is configured to transmit a write flag to the CAM controller based on a write command, and wherein the CAM controller is configured to obtain a fourth CAM address of the CAM cell array based on the first data received from the input receiver, and output the first data pattern corresponding to the fourth third-CAM address based on receiving the write flag.

7. The memory device of claim 6, further comprising:

an input/output driver configured to transmit the first data pattern as the input data to the memory cell array, wherein the address information comprises a first row address and a first column address corresponding to the write command, and wherein the memory cell array is configured to store the input data based on the first row address and the first column address.

8. The memory device of claim 4, wherein the command decoder is configured to transmit a read flag to the CAM controller based on a read command, wherein the address information comprises a second row address and a second column address corresponding to the read command, and wherein the memory cell array is configured to output the output data based on the second row address and the second column address.

9. The memory device of claim 8, further comprising:

an input/output sense amplifier configured to transmit the output data to the CAM physical layer, wherein the CAM physical layer comprises:

a data pattern comparator configured to compare the output data with the plurality of data patterns stored in the CAM cell array and output the second CAM address corresponding to the second data pattern matching the output data; and an output driver configured to output the second CAM address as the second data through the plurality of external data pads.

10. The memory device of claim 9, wherein the data pattern comparator is further configured to determine the second data pattern by identifying one of the plurality of data patterns having a smallest number of bit difference with the output data.

11. A method of operating a memory device, the method comprising:

receiving a plurality of content addressable memory (CAM) addresses;

receiving a plurality of data patterns through a plurality of external data pads, each of the plurality of data patterns corresponding to one of the plurality of CAM addresses;

storing, by a content addressable memory (CAM) cell array, the plurality of data patterns in a CAM cell array based on the plurality of CAM addresses;

receiving, by a CAM physical layer, first data through the plurality of external data pads based on a memory access signal being a write operation signal, the first data comprising a first CAM address;

selecting, by the CAM physical layer, a first data pattern from among the plurality of data patterns based on the first CAM address; and transmitting, by the CAM physical layer, the selected first data pattern as input data to first memory cells of a memory cell array of the memory device corresponding to address information which is decoded by an address decoder of the memory device based on a memory address of the memory cell array received from an external device.

12. The method of claim 11, wherein a number of the plurality of external data pads is less than a number of internal data paths between the CAM physical layer and the memory cell array.

13. The method of claim 11, further comprising:

comparing, by the CAM physical layer, output data from the memory cell array with the plurality of data patterns stored based on the address information based on the memory access signal being a read operation signal; and outputting a second CAM address corresponding to a second data pattern matching the output data as second data through the plurality of external data pads.

14. The method of claim 13, wherein the comparing the output data with the plurality of data patterns comprises:

determining the second data pattern by identifying one of the plurality of data patterns having a smallest number of bit difference with the output data.

15. The method of claim 13, wherein a number of bits of each of the plurality of data patterns is an integer multiple of a number of bits of the first data or the second data.

16. A memory system comprising:

a logic chip comprising a logic core, a memory controller and a first content addressable memory (CAM) physical layer; and a memory chip stacked on the logic chip, wherein the memory chip comprises:

a memory cell array;

an address decoder configured to output address information based on an address received from the logic chip;

a command decoder configured to generate a memory access signal based on a command received from the logic chip; and a second CAM physical layer connected to the first CAM physical layer through a plurality of external data pads, the second CAM physical layer is configured to:

based on the memory access signal being a write operation signal, receive first data through the plurality of external data pads, the first data comprising a first CAM address, select a first data pattern from among a plurality of data patterns based on the first CAM address, and transmit the selected first data pattern as input data to first memory cells of the memory cell array corresponding to the address information, and based on the memory access signal being a read operation signal, compare output data from the memory cell array with the plurality of data patterns based on the address information, and output a second CAM address corresponding to a second data pattern matching the output data as second data through the plurality of external data pads.

17. The memory system of claim 16, wherein the first CAM physical layer comprises a first CAM cell array configured to store the plurality of data patterns, wherein the second CAM physical layer comprises a second CAM cell array configured to store the plurality of data patterns, wherein the first CAM physical layer and the second CAM physical layer are configured to exchange encoded data with a smaller capacity than original data through the plurality of external data pads based on the plurality of data patterns, and wherein a number of the plurality of external data pads is smaller than a number of internal data paths of the logic chip or the memory chip.

18. The memory system of claim 17, wherein the memory chip further comprises:

a CAM controller configured to control an operation of the second CAM physical layer based on a command flag corresponding to the command received from the command decoder.

19. The memory system of claim 18, wherein the second CAM physical layer is configured to transmit the first data received from the plurality of external data pads to the CAM controller, wherein the command decoder is configured to transmit a write flag to the CAM controller based on a write command, wherein the CAM controller is configured to obtain a second CAM address of the CAM cell array from the first data, and output the first data pattern corresponding to the second CAM address, wherein the address information comprises a first row address and a first column address, and wherein the memory cell array is configured to store the input data based on the first row address and the first column address.

20. The memory system of claim 18, wherein the command decoder is configured to transmit a read flag to the CAM controller based on a read command, wherein the address information comprises a second row address and a second column address, wherein the memory cell array is configured to output the output data based on the second row address and the second column address, and wherein the second CAM physical layer is configured to compare the output data with the plurality of data patterns stored in the CAM cell array, output the first CAM address corresponding to the second data pattern matching the output data, and output the first CAM address as the second data through the plurality of external data pads.

* * * * *